(12) United States Patent
Kim

(10) Patent No.: US 8,398,317 B2
(45) Date of Patent: Mar. 19, 2013

(54) METHOD OF CONTROLLING IMAGING APPARATUS AND IMAGING APPARATUS USING THE SAME

(75) Inventor: Il-do Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/938,821

(22) Filed: Nov. 3, 2010

(65) Prior Publication Data

US 2011/0103788 A1 May 5, 2011

(30) Foreign Application Priority Data

Nov. 3, 2009 (KR) .................. 10-2009-0105601

(51) Int. Cl.
*G03B 9/40* (2006.01)
(52) U.S. Cl. ........................................ 396/484
(58) Field of Classification Search .................. 396/452, 396/471, 483, 484; 348/367
See application file for complete search history.

(56) References Cited

U.S. PATENT DOCUMENTS

| | | | | |
|---|---|---|---|---|
| 6,542,194 B1* | 4/2003 | Juen | ............................. | 348/367 |
| 6,930,724 B1* | 8/2005 | Tengeiji et al. | ............... | 348/367 |
| 7,440,022 B2* | 10/2008 | Matsumoto | ................... | 348/364 |
| 7,583,312 B2* | 9/2009 | Hiramatsu | .................... | 348/367 |
| 7,733,399 B2* | 6/2010 | Totori | ......................... | 348/296 |
| 7,864,242 B2* | 1/2011 | Namai et al. | ................. | 348/367 |
| 7,907,206 B2* | 3/2011 | Toyoda | ........................ | 348/367 |
| 7,918,616 B2 | 4/2011 | Fukuda | | |
| 2003/0030737 A1* | 2/2003 | Yanai | ........................... | 348/296 |
| 2006/0087573 A1 | 4/2006 | Harada | | |
| 2008/0252768 A1 | 10/2008 | Suzuki | | |
| 2008/0304820 A1* | 12/2008 | Fukuda | ......................... | 396/471 |
| 2011/0149129 A1* | 6/2011 | Kim et al. | ..................... | 348/296 |

FOREIGN PATENT DOCUMENTS

| | | |
|---|---|---|
| EP | 1 898 635 | 3/2008 |
| JP | 2001-042386 | 2/2001 |
| JP | 2006-101492 | 4/2006 |
| JP | 2007-282128 | 10/2007 |
| JP | 2008-304565 | 12/2008 |

* cited by examiner

*Primary Examiner* — Rodney Fuller
(74) *Attorney, Agent, or Firm* — The Farrell Law Firm, P.C.

(57) ABSTRACT

A method of controlling an imaging apparatus and an imaging apparatus using the same are provided, wherein the method controls the imaging apparatus including an image sensor that performs an electronic shutter function by calculating a moving characteristic of a mechanical shutter based on an amount of electric charge accumulated in a first area and an amount of electric charge accumulated in a second area, and controlling the electronic shutter function of the image sensor based on the calculated moving characteristic of the mechanical shutter. Accordingly, the performance of the imaging apparatus using a focal plane shutter can be improved.

15 Claims, 13 Drawing Sheets

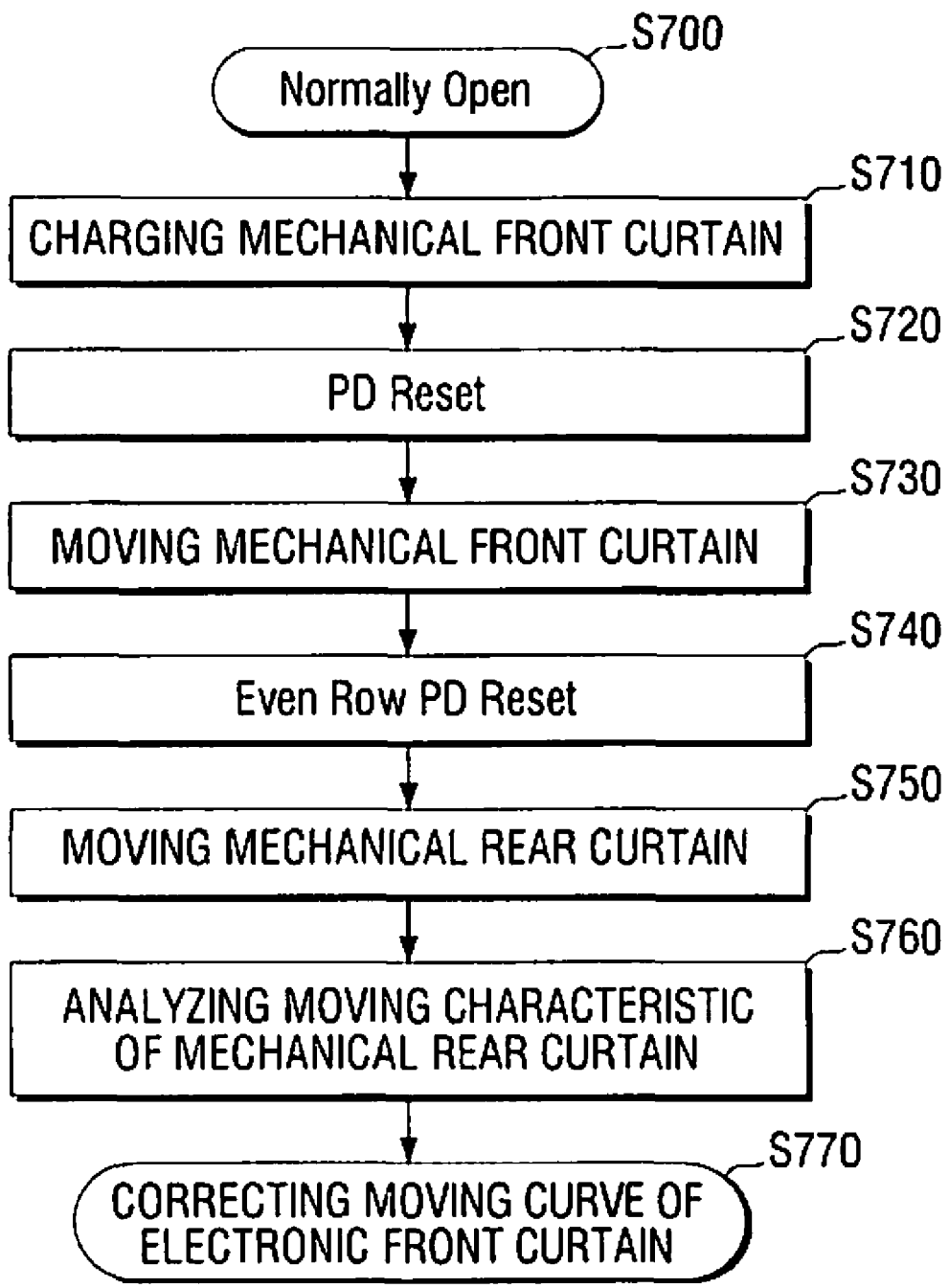

METHOD OF CONTROLLING IMAGING APPARATUS AND IMAGING APPARATUS USING THE SAME

PRIORITY

This application claims priority to Korean Patent Application No. 10-2009-0105601, which was filed on Nov. 3, 2009, in the Korean Intellectual Property Office, the entire disclosure of which is incorporated herein by reference.

BACKGROUND OF THE INVENTION

1. Field of the Invention

The present invention relates generally to a method of controlling an imaging apparatus by detecting a moving characteristic of a mechanical shutter and an imaging apparatus using the same, and more particularly, to a method of controlling an imaging apparatus, which calculates a moving characteristic of a mechanical shutter and controls an electronic shutter operation of an image sensor according to the calculated moving characteristic of the mechanical shutter, and an imaging apparatus using the same.

2. Description of the Related Art

Camera shutters are generally classified as lens shutters and focal plane shutters. A lens shutter is located in the proximity of a lens, whereas a focal plane shutter is located in the proximity of a focal surface.

The focal plane shutter is classified into two types, i.e., a horizontal shutter and a vertical shutter, according to moving directions of front and rear curtains. Currently, the vertical shutter is commonly used because of good performance.

A subject that is incident on an imaging surface through a lens is exposed to light, as the two curtains including the front curtain and the rear curtain are moving. That is, light exposure begins as the front curtain moves and the imaging surface of the imaging apparatus is opened, and a photographing operation finishes as the rear curtain moves, after a predetermined time elapses according to a pre-set shutter speed.

However, because the front and the rear curtains are configured mechanically, the front curtain may collide with a shutter substrate when the front curtain finishes moving and may cause a collision vibration, which is commonly referred to as a front curtain shock. Because the front curtain shock occurs when the imaging surface is initially exposed to the light, the vibration on the imaging surface has a bad influence on an overall photographing operation. However, because the rear curtain moves when the photographing operation finishes, the vibration caused by the rear curtain has almost no influence on the photographing operation.

Also, because the front curtain should be always charged in order to photograph in a live view mode, a temporal gap, i.e., a release time lag, occurs.

In order to remove such effects of the front curtain, a technique for electronically processing the front curtain of the focal plane shutter has been proposed. This technique simulates the function of the front curtain by scanning pixels in a sequence on a pixel row basis using a reset signal that indicates a beginning of light exposure for each pixel in an image sensor of an imaging apparatus, such as a Charge-Coupled Device (CCD) or a Complementary Metal-Oxide Semiconductor (CMOS) Image Sensor (CIS). In other words, the mechanical front curtain is replaced by electronically controlling a reset signal of an image sensor, while a rear curtain moves in an existing mechanical method.

However, mechanical characteristics, such as a change in a curtain speed due to the changes in temperature, humidity, and posture of the camera, and different curtain speeds at the beginning point and the finishing points may appear because the rear curtain still uses the mechanical method. In this case, if the front curtain also uses the mechanical method, there is no problem because the front and the rear curtains maintain the same mechanical characteristics. However, if the front curtain is replaced with an electronic method, as described above, the moving characteristic of the electronic front curtain and the moving characteristic of the mechanical rear curtain are not identical to each other, which causes vignetting and deteriorates the performance of the imaging apparatus.

SUMMARY OF THE INVENTION

Accordingly, the present invention has been designed to solve at least some the above-mentioned and other problems occurring in the prior art.

An aspect of an embodiment of the present invention provides a method of controlling an image apparatus, which calculates a moving characteristic of a mechanical shutter and controls an electronic shutter operation of an image sensor according to the calculated moving characteristic of the mechanical shutter, and an imaging apparatus using the same.

An aspect of another embodiment of the present invention improves performance of an imaging apparatus using a focal plane shutter method and an electronic shutter function of an image sensor.

An aspect of another embodiment of the present invention provides an imaging apparatus without using a mechanical front curtain, which is capable of calculating a moving characteristic of a mechanical rear curtain and correcting an electronic shutter operation of an image sensor according to the moving characteristic of the rear curtain, thereby reducing a volume of a shutter module and a manufacturing cost.

In accordance with an aspect of the present invention, an imaging apparatus is provided. The apparatus includes an image sensor that performs an electronic shutter function, and includes a mechanical shutter including a first curtain and a second curtain, and controls light incident on the image sensor. The apparatus also includes a controller that calculates a moving characteristic of the mechanical shutter based on an amount of electric charge accumulated in a first area of the image sensor and an amount of electric charge accumulated in a second area of the image sensor, while the mechanical shutter is moving, and controls the electronic shutter function of the image sensor based on the calculated moving characteristic of the mechanical shutter.

In accordance with another aspect of the present invention, an imaging apparatus is provided. The apparatus includes an image sensor that performs an electronic shutter function, and includes a mechanical shutter including a single curtain, and controls light incident on the image sensor. The apparatus also includes a controller that calculates a moving characteristic of the mechanical shutter based on an amount of electric charge accumulated in a first area of the image sensor and an amount of electric charge accumulated in a second area of the image sensor, while the mechanical shutter is moving, and controls the electronic shutter function of the image sensor based on the calculated moving characteristic of the mechanical shutter.

In accordance with another aspect of the present invention, a method is provided for controlling an imaging apparatus including an image sensor that performs an electronic shutter function. The method includes detecting an amount of electric charge accumulated in a first area of the image sensor and an amount of electric charge accumulated in a second area of the image sensor, calculating a moving characteristic of the mechanical shutter based on the amount of electric charge accumulated in the first area and the amount of electric charge accumulated in the second area, and controlling the electronic shutter function of the image sensor based on the calculated moving characteristic of the mechanical shutter.

Additional aspects and advantages of the present inventive concept will be set forth in the detailed description, will be obvious from the detailed description, or may be learned by practicing the invention.

BRIEF DESCRIPTION OF THE DRAWINGS

The above and/or other aspects, features, and advantages of the present invention will be more apparent by describing in detail certain embodiments of the present invention, with reference to the accompanying drawings, in which:

FIG. 6 is a flowchart illustrating a method of calculating a moving characteristic of a mechanical rear curtain according to an embodiment of the present invention;

DETAILED DESCRIPTION OF EMBODIMENTS OF THE INVENTION

Figure 1:
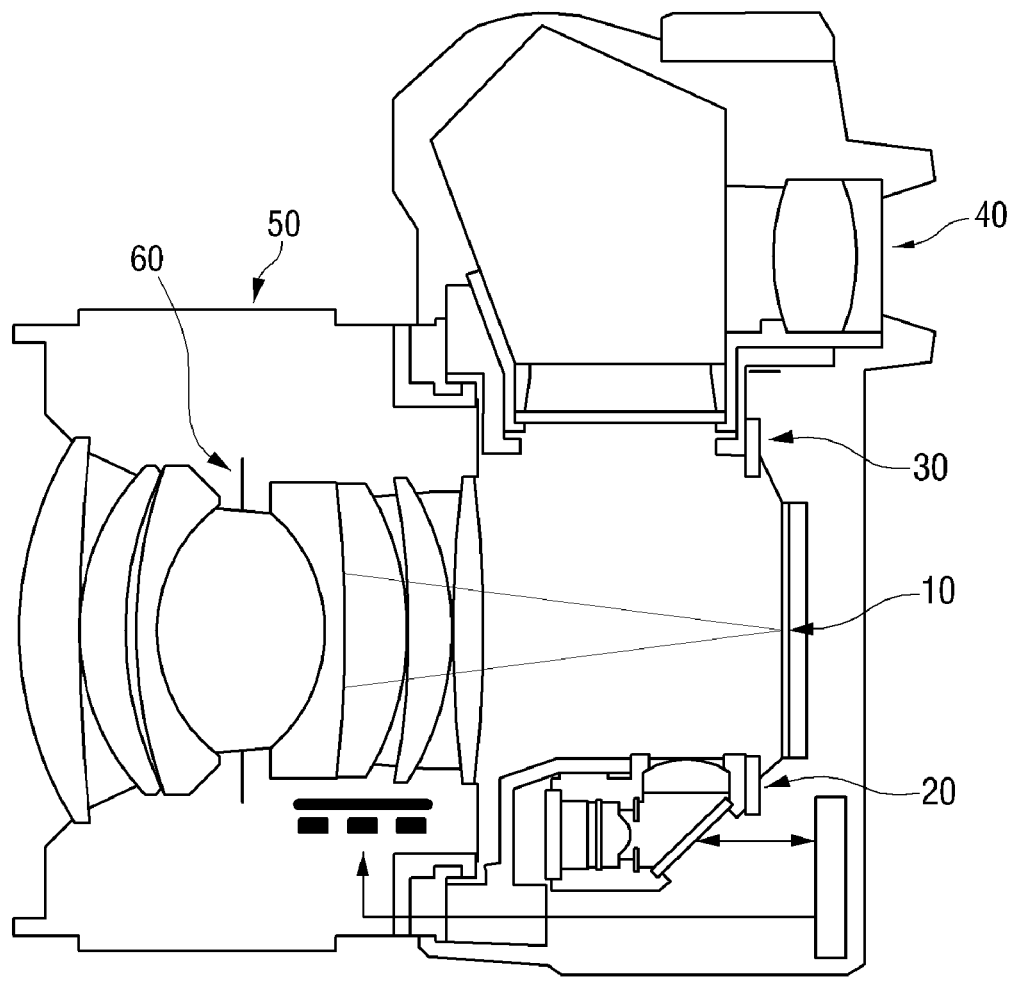
FIG. 1 illustrates an imaging apparatus according to an embodiment of the present invention.

Hereinafter, various embodiments of the present invention will be described in greater detail with reference to the accompanying drawings.

In the following description, same reference numerals are used for the same elements when they are depicted in different drawings.

Further, the matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the invention with unnecessary detail.

Hereinafter, for the convenience of explanation, a front curtain and a rear curtain of a focal plane shutter will be referred to as "a mechanical front curtain" and "a mechanical rear curtain", respectively, and an image sensor that electronically performs a function of a mechanical front curtain will be referred to as "an electronic front curtain".

FIG. 1 illustrates an imaging apparatus according to an embodiment of the present invention.

As shown in FIG. 1, the imaging apparatus includes an image sensor 10, a mechanical front curtain 20, a mechanical rear curtain 30, a viewfinder 40, a lens 50, and an aperture 60. The imaging apparatus, which operates with a focal plane shutter, includes the mechanical front curtain 20 and the mechanical rear curtain 30 of the focal plane shutter located ahead of the image sensor 10.

The image sensor 10 receives light through the lens 50 and converts the light into an electrical signal, and may be a CCD or a CIS. According to an embodiment of the present invention, the image sensor 10 controls a reset timing to begin to accumulate charge by an imaging element. The image sensor 10 replaces the mechanical front curtain 20 and operates as an electronic front curtain.

The mechanical front curtain 20 and the mechanical rear curtain 30 of the focal plane shutter open and close an optical path to the image sensor 10. According to the moving direction of the front curtain 20 and the rear curtain 30, there may be a horizontal shutter and a vertical shutter; however, hereinafter, only the vertical shutter will be described for convenience.

The mechanical front curtain 20 shields the image sensor 10 from light before the image sensor 10 is exposed to the light, and moves to let the image sensor 10 be exposed to the light. The mechanical rear curtain 30 finishes the light exposure after the front curtain 20 begins the light exposure. Accordingly, the focal plane shutter performs light exposure while moving in a slit pattern (moves in parallel, leaving a predetermined gap at intervals), such as scanning the image sensor 10.

The aperture 60 is disposed within the lens 50 to control an aperture diameter and an amount of light passing through the lens 50. In the case of a lens shutter, as the aperture diameter increases, it is more difficult to operate as a high speed shutter. In the case of a focal plane shutter, moving in a slit pattern makes it possible to use a highest speed shutter at any aperture value.

The view finder 40 is an instrument through which a user sees an image in order to image or focus it when photographing the image using the imaging apparatus.

Hereinafter, a problem that may occur when an image is photographed using an electronic front curtain and a mechanical rear curtain will be explained with reference to FIGS. 2A to 2C.

Figure 2A:
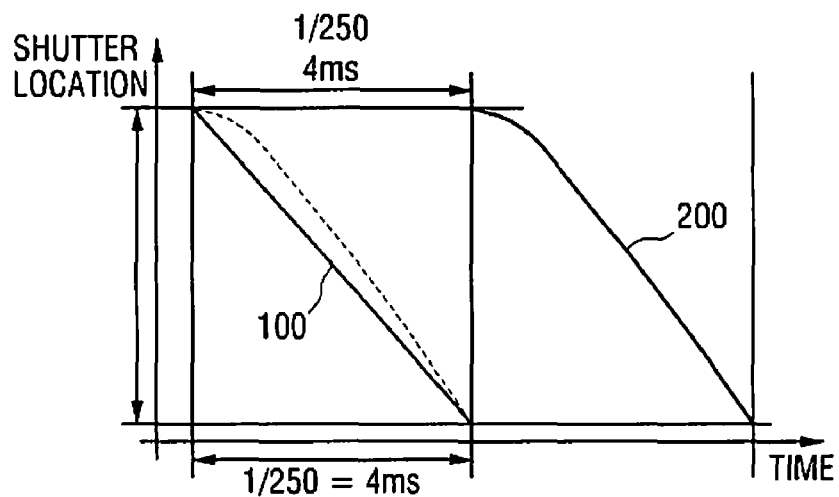
FIG. 2A is a graph illustrating an operation of an electronic front curtain and an operation of a mechanical rear curtain.
Figure 2B:
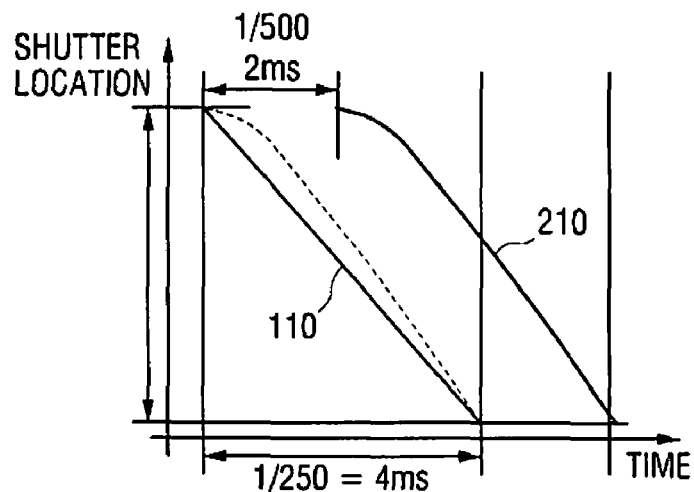
FIG. 2B is a graph illustrating an operation of an electronic front curtain and an operation of a mechanical rear curtain.
Figure 2C:
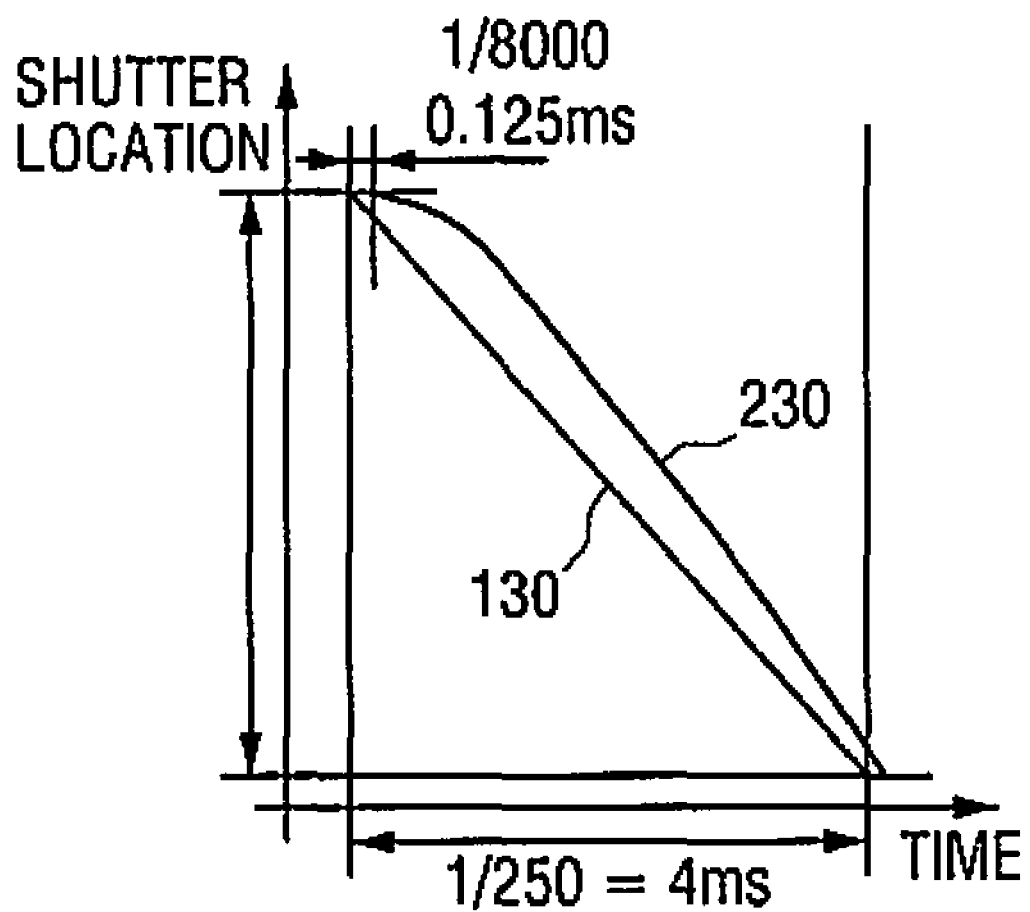
FIG. 2C is a graph illustrating an operation of an electronic front curtain and an operation of a mechanical rear curtain.

FIGS. 2A to 2C are graphs illustrating an operation if a shutter speed is 4 ms, 2 ms, and 0.125 ms, respectively. As the shutter speed increases from FIG. 2A to FIG. 2C, an effective exposure time decreases.

Referring to FIG. 2A, in which the shutter speed is relatively slow, a gap between a moving curve 100 of an electronic shutter and a moving curve 200 of a mechanical rear curtain is relatively large and the mechanical rear curtain begins to move after the electronic shutter finishes the moving. Accordingly, there is no variation in the amount of exposure light according to the location of the shutter on the image sensor 10.

Referring to FIG. 2B, the shutter speed is two times faster than that illustrated in FIG. 2A and the mechanical rear curtain begins to move while the electronic front curtain is moving. Comparing a moving curve 110 of the electronic shutter and a moving curve 210 of the mechanical rear curtain, the amount of exposure light varies according to the location of the image sensor 10.

Referring to FIG. 2C, in which the shutter speed is much faster than in both FIGS. 2A and 2B, the variation in the amount of exposure light according to the location of the shutter becomes greater, thus causing a light exposure spot and thus making it difficult to achieve a good quality image.

Accordingly, in order to correct the moving curve of the electronic front curtain according to a moving characteristic of the mechanical rear curtain, the moving characteristic of the mechanical rear curtain should be identified.

Hereinafter, a method for calculating a moving characteristic of a mechanical rear curtain according to an embodiment of the present invention will be described with reference to FIGS. 3 and 4. For ease of description, it is assumed herein that a shutter speed is 0.25 ms and a vertical-axis length of the image sensor 10 is 15.6 mm.

Figure 3:
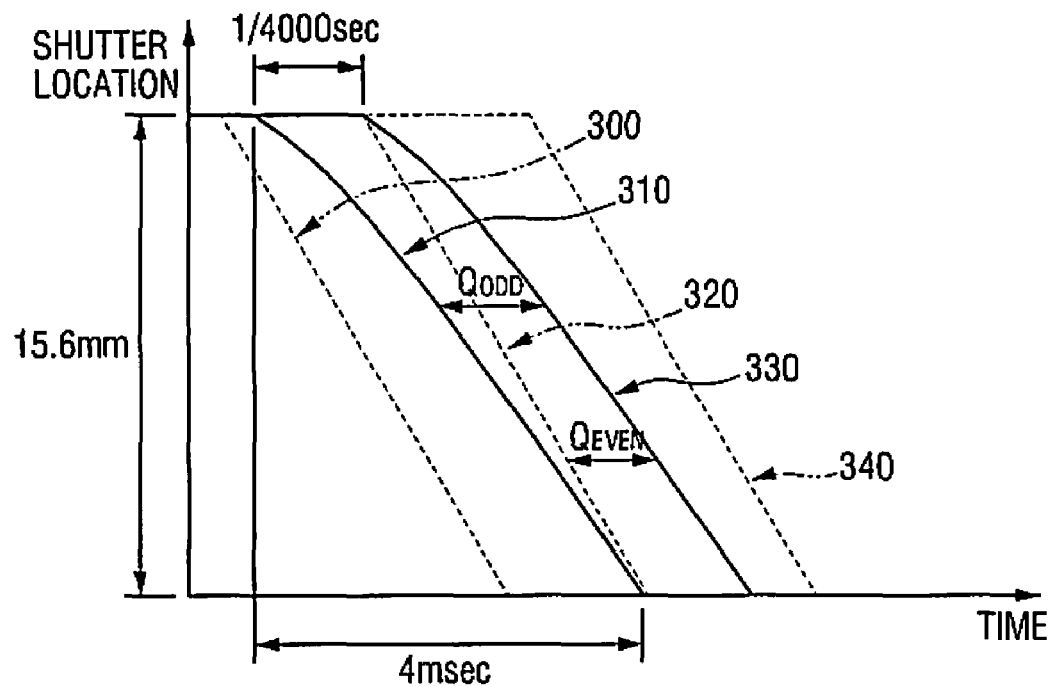
FIG. 3 illustrates a method of calculating a moving characteristic of a mechanical rear curtain according to an embodiment of the present invention.

Referring to the graph of FIG. 3, the moving characteristic of the mechanical rear curtain is calculated through the processes of resetting a PhotoDiode (PD) (300), moving the mechanical front curtain (310), resetting a PD corresponding to an even row of the image sensor (320), moving the mechanical rear curtain 330, and detecting an output signal (340).

After the mechanical front curtain has moved, an amount of electric charge at each shutter location is detected. In accordance with an embodiment of the invention, the amount of electric charge at the shutter locations is detected five times 400, 410, 420, 430, 440, but this is merely an example. The number of operations of detecting the amount of electric charge may be higher or lower than 4.

The operation 300 of resetting for removing unnecessary electric charge of an element of the image sensor 10 and beginning to accumulate the electric charge is performed first. Next, the mechanical front curtain moves (310) such that some area of the image sensor is exposed to light and electric charge is accumulated in the image sensor. The operation of resetting a photodiode corresponding to an even row of the image sensor is performed (310) and accordingly the electric charge already accumulated in the photodiode corresponding to the even row is extinguished and electric charge begins to be accumulated again after the reset. The electric charge continues to be accumulated until the mechanical rear curtain moves (330).

In FIG. 3, $Q_{ODD}$ denotes an amount of electric charge accumulated in an odd row of the image sensor until the mechanical rear curtain moves (330) after the reset (300) and $Q_{EVEN}$ denotes an amount of electric charge accumulated in an even row of the image sensor until the mechanical rear curtain moves (330) after the operation of resetting the even row of the image sensor 10 (310).

As illustrated in FIG. 3, there is a difference between the amount of electric charge accumulated in the photodiode corresponding to the odd row of the image sensor and the amount of electric charge accumulated in the photodiode corresponding to the even row.

Figure 4:
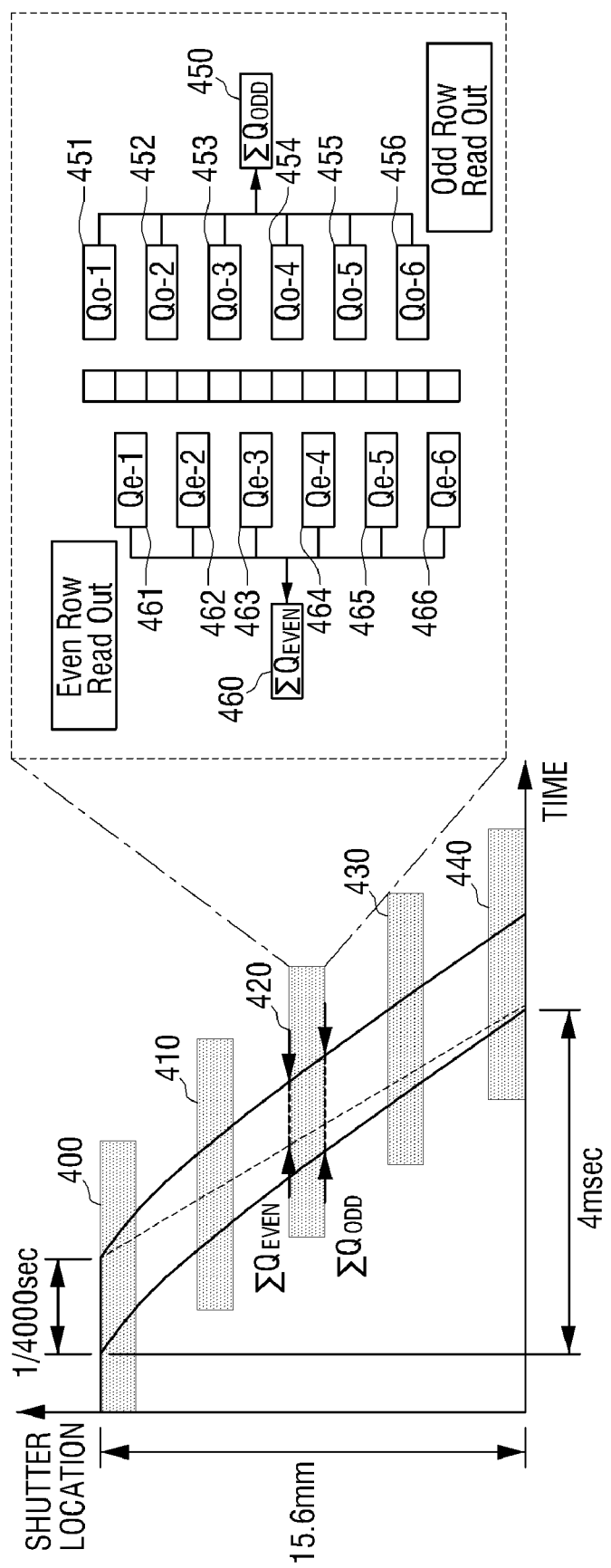
FIG. 4 illustrates a method of calculating a moving characteristic of a mechanical rear curtain according to an embodiment of the present invention.

In FIG. 4, $\Sigma Q_{ODD}$ 450 denotes a sum of electric charges 451, 452, 453, 454, 455, and 456, which correspond to the odd row of the image sensor at the third shutter location 420, $\Sigma Q_{EVEN}$ 460 denotes the sum of electric charges 461, 462, 463, 464, 465, and 466, which correspond to the even row of the image sensor at the third shutter location 420. $\Sigma Q_{EVEN}$ 460 may be less than $\Sigma Q_{ODD}$ 450.

As described above, by resetting the photodiode corresponding to the even row of the image sensor, the amount of electric charge accumulated in the photodiode corresponding to the even row of the image sensor is made different from the amount of electric charge accumulated in the photodiode corresponding to the odd row, and these processes (400, 410, 420, 430, and 440) are performed in the shutter several times.

Figure 5A:
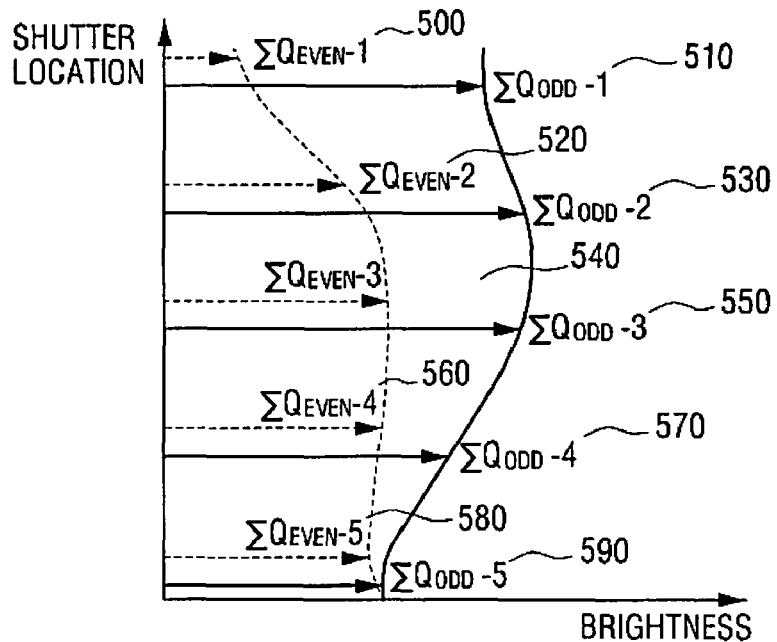
FIG. 5A illustrates a method of calculating a moving characteristic of a mechanical rear curtain according to an embodiment of the present invention.

FIG. 5A is a graph illustrating a difference in an amount of electric charge according to the location of the shutter. In the graph of FIG. 5A, a vertical axis denotes location of a shutter and a horizontal axis denotes brightness. Because the brightness is in proportion to the amount of electric charge, the horizontal axis may denote the amount of electric charge.

More specifically, the graph illustrated in FIG. 5A illustrates amounts of electric charge accumulated in the odd row and the even row of the image sensor at the first shutter location 400 to the fifth shutter location 440. More specifically, at the first shutter location 400, an amount of electric charge in the odd row of the image sensor is $\Sigma Q_{ODD}$-1 510 and an amount of electric charge in the even row is $\Sigma Q_{EVEN}$-1 500, and the amounts of electric charge at the five locations in total are displayed.

Figure 5B:
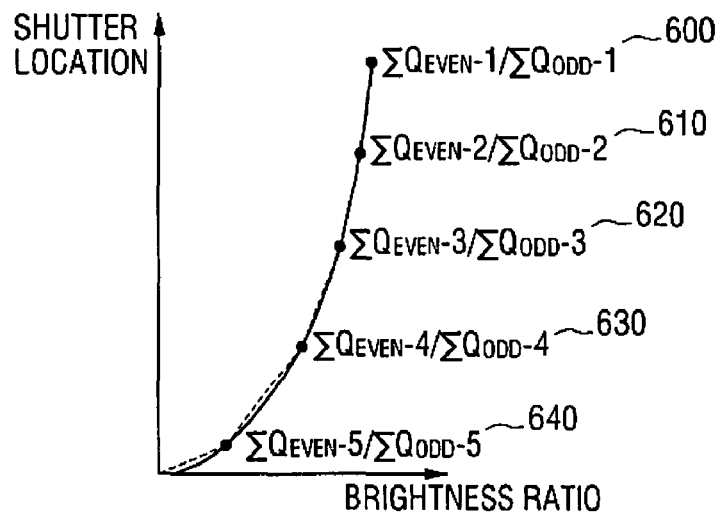
FIG. 5B illustrates a method for calculating a moving characteristic of a mechanical rear curtain according to an embodiment of the present invention.

FIG. 5B is a graph illustrating a ratio of the amount of electric charge in the even row to the amount of electric charge in the odd row at each shutter location, based on the amount of electric charge accumulated at each shutter location of FIG. 5A. In the graph of FIG. 5B, a vertical axis denotes the shutter location and a horizontal axis denotes a brightness ratio or a ratio of an amount of electric charge.

Referring to FIG. 5B, the ratio of the amount of electric charge at the first shutter location 400 is expressed by $\Sigma Q_{EVEN}$-1/$\Sigma Q_{ODD}$-1 600, the ratio at the second shutter location 410 is expressed by $\Sigma Q_{EVEN}$-2/$\Sigma Q_{ODD}$-2 610, the ratio at the third shutter location 420 is expressed by $\Sigma Q_{EVEN}$-3/$\Sigma Q_{ODD}$-3 620, the ratio at the fourth shutter location 430 is expressed by $\Sigma Q_{EVEN}$-4/$\Sigma Q_{ODD}$-4 630, and the ratio at the fifth shutter location 440 is expressed by $\Sigma Q_{EVEN}$-5/$\Sigma Q_{ODD}$-5 640.

Figure 5C:
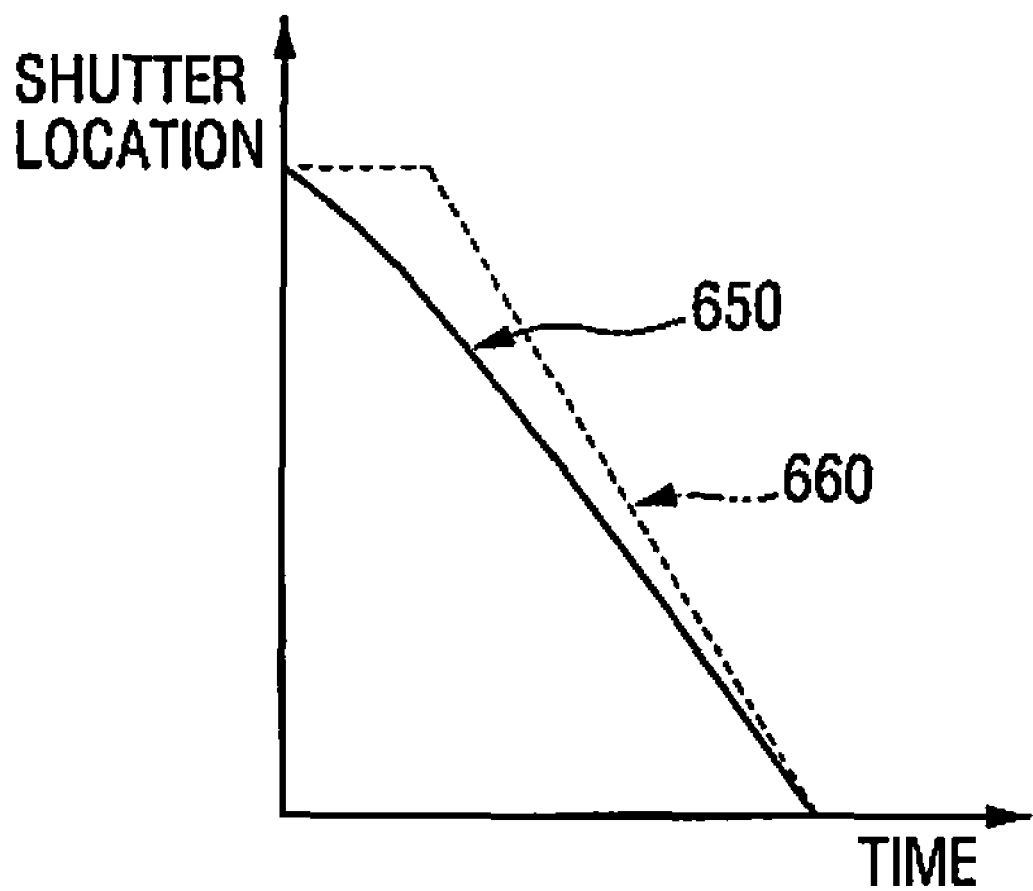
FIG. 5C illustrates a method of calculating a moving characteristic of a mechanical rear curtain according to an embodiment of the present invention.

FIG. 5C illustrates a moving curve 650 of the electronic front curtain, which has been corrected according to the moving characteristic of the mechanical rear curtain calculated based on the graphs of FIGS. 5A and 5B. By inversely calculating the graph of FIG. 5B, which is obtained based on the ratio calculated in FIG. 5A, the graph of FIG. 5C is obtained.

More specifically, as the ratio of the amount of electric charge in the even row to the amount of electric charge in the odd row is smaller, the moving speed of the mechanical rear curtain is higher. The moving speed may be expressed by the slope of the curve 650 expressed by a solid line in FIG. 5C.

In the above-described embodiment, the distribution of detected areas according to the shutter location and the number of pixels vary, and the shutter speed and the size of the image sensor are not limited to the above-mentioned values. Also, an odd row of the image sensor may be reset after the mechanical front curtain has moved or a specific area of the image sensor may be set to be reset after the mechanical front curtain has moved.

FIG. 6 is a flowchart illustrating a method of calculating a moving characteristic of a mechanical rear curtain and correcting a moving curve of an electronic front curtain.

In an imaging system using a focal plane shutter, a mechanical front curtain and a mechanical rear curtain are opened in a live view mode in step S700. If a photographing operation begins, the mechanical front curtain is charged and blocks an optical path to the image sensor in step S710. All photodiodes of the image sensor are reset, such that unnecessary electric charge of the image sensor is removed and the image sensor is ready to accumulate electric charge in step S730. Further, the mechanical front curtain moves down such that light exposure begins in step S730.

After the mechanical front curtain has moved, a photodiode corresponding to an even row of the image sensor is reset such that the accumulated electric charge is removed in step S740. In step S750, the mechanical rear curtain begins to move down in order to restrict the light exposure.

Through the above-described process, there is a difference in the amounts of electric charge between the even row and the odd row, and a moving characteristic of the mechanical rear curtain is analyzed based on the ratio of different amounts of electric charge in step S760. The moving curve of the electronic front curtain is corrected according to the moving characteristic of the mechanical rear curtain in step S770.

In the above-described embodiment, the shutter is limited to the vertical shutter, and thus the mechanical front curtain and the mechanical rear curtain move down. However, if the shutter is a horizontal shutter, the curtains move to the right or left.

Figure 7:
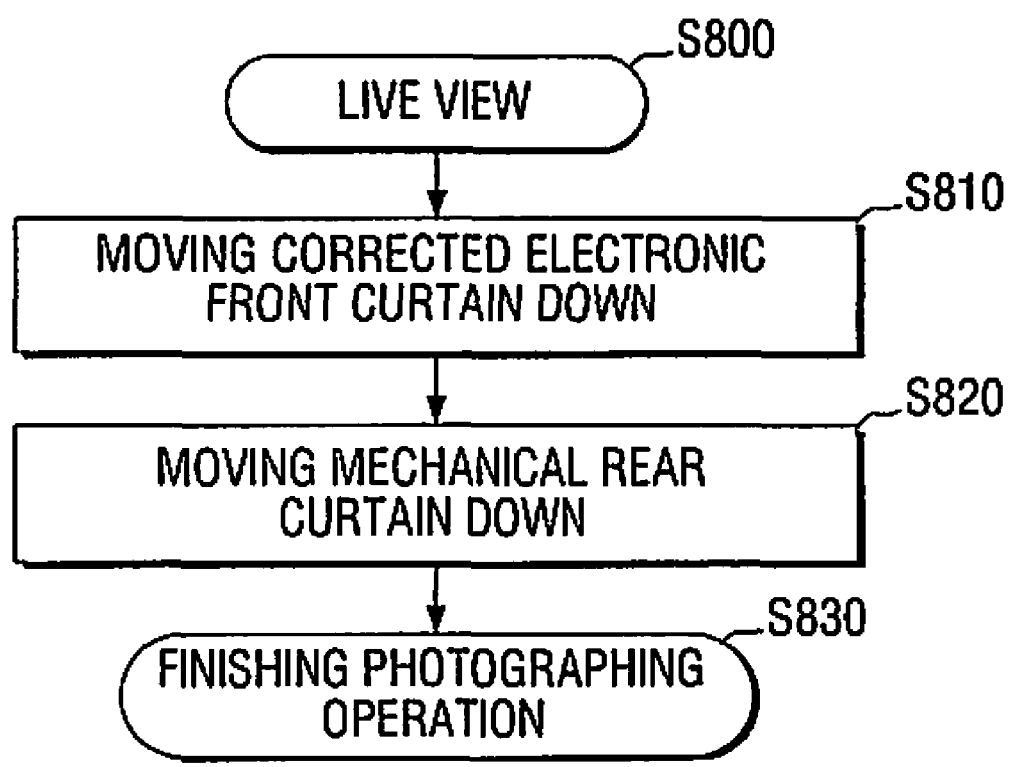
FIG. 7 is a flowchart illustrating a photographing method using a corrected electronic front curtain curve.

FIG. 7 is a flowchart illustrating a method of photographing an image using a corrected electronic front curtain.

Referring to FIG. 7, a photographing operation begins in a live view mode in step S800, and an electronic front curtain moves according to a moving characteristic of a mechanical rear curtain in step S810. In practice, resetting photodiodes on a row basis by controlling the image sensor replaces the function of the electronic front curtain. Light exposure is performed after the electronic front curtain has moved and then the light is blocked as the mechanical rear curtain moves in step S820. In step S830, electric charge stored in the image sensor is converted into electric signals such that an image is obtained and the photographing operation finishes.

In the above-described embodiment, the focal plane shutter including the mechanical front curtain and the mechanical rear curtain is provided. Hereinafter, an imaging apparatus including a focal plane shutter including only a mechanical rear curtain, as an electronic front curtain completely replaces a mechanical front curtain, will be explained.

Figure 8:
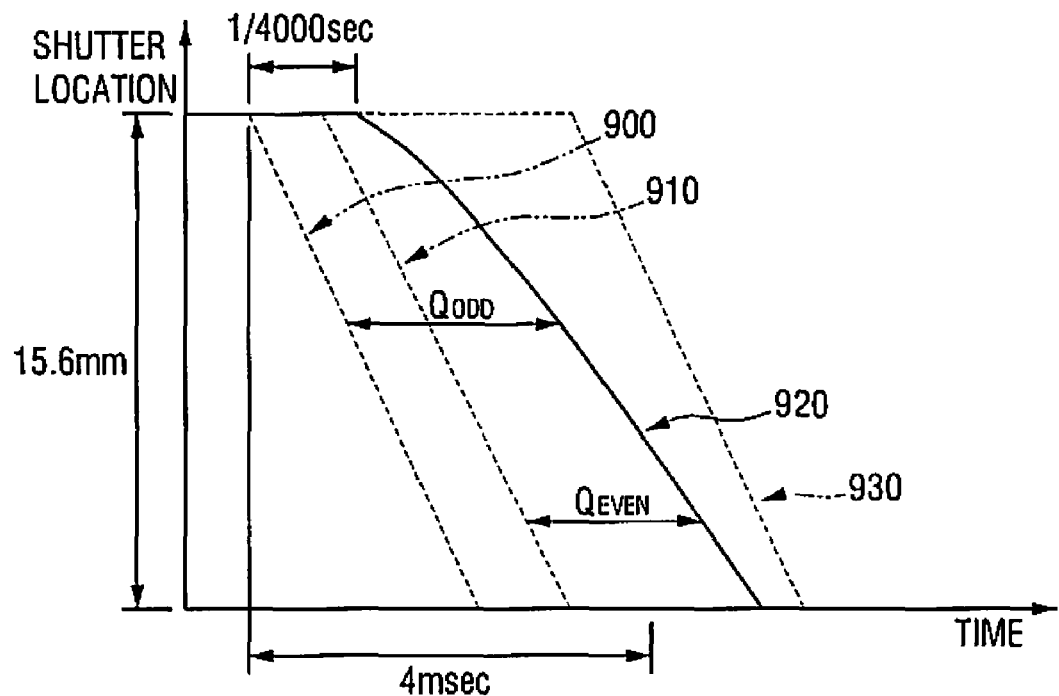
FIG. 8 is a graph illustrating a method of calculating a moving characteristic of a mechanical rear curtain in a focal plane shutter including only the mechanical rear curtain according to another embodiment of the present invention.

FIG. 8 is a graph illustrating a method of calculating a moving characteristic of a mechanical rear curtain in a focal plane shutter including only the mechanical rear curtain according to another embodiment of the present invention. For the convenience of explanation, it is assumed that a height of the image sensor is 15.6 mm and a shutter speed is 0.25 ms.

Referring to FIG. 8, a moving characteristic of the mechanical rear curtain is calculated through the processes of resetting an entire area of the image sensor (900), resetting an even row of the image sensor (910), moving the mechanical rear curtain (920), and detecting an output signal (930).

Through the above processes, an amount of electric charge accumulated in an odd row of the image sensor is in proportion to an amount of exposure light during a period until the mechanical rear curtain moves (920) after the entire area of the image sensor has been reset (900), and an amount of electric charge accumulated in the even row of the image sensor is in proportion to an amount of exposure light during a period until the mechanical rear curtain moves (920) after the even row of the image sensor has been reset (910). Therefore, the amounts of electric charge accumulated in the even row and the odd row are different.

In this embodiment, the distribution of the detected areas varies and the number of detected pixels is also variable. Additionally, the shutter speed and the size of the image sensor are not limited to the above-mentioned values.

Figure 9:
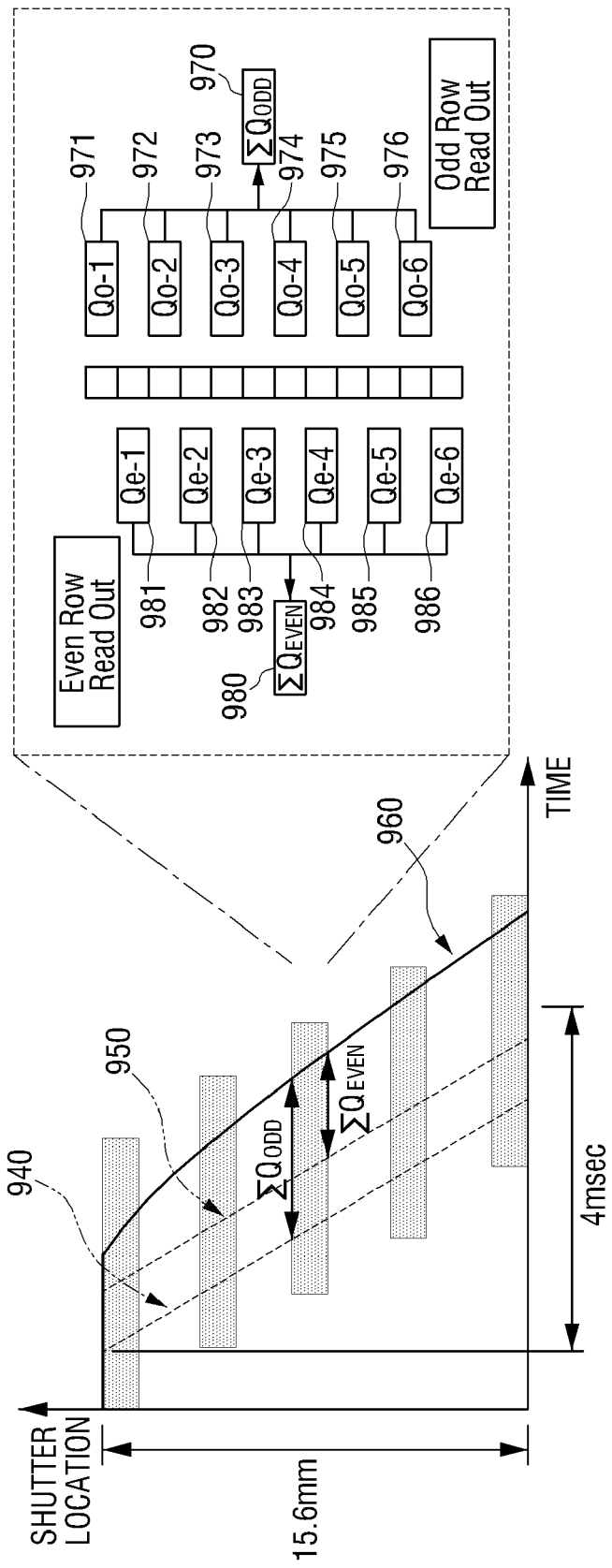
FIG. 9 is a graph illustrating a method of calculating a moving characteristic of a mechanical rear curtain in a focal plane shutter including only the mechanical rear curtain according to an embodiment of the present invention.

FIG. 9 is a graph illustrating a method of calculating a moving characteristic of a mechanical rear curtain in a focal plane shutter including only the mechanical rear curtain according to an embodiment of the present invention.

Referring to FIG. 9, the sum of electric charges 981, 982, 983, 984, 985, and 986 accumulated in the even row is expressed by $\Sigma Q_{EVEN}$ 980, and the sum of electric charges 971, 972, 973, 974, 975, and 976 accumulated in the odd row is expressed by $\Sigma Q_{ODD}$ 970. Because a photodiode corresponding to the even row is reset late, $\Sigma Q_{EVEN}$ 980 may be less than $\Sigma Q_{ODD}$ 970. Because the amounts of electric charge are different according to the areas of the image sensor, a moving characteristic of the mechanical rear curtain is analyzed by calculating a ratio of different amounts of electric charge. The calculating of the ratio was described above with reference to FIGS. 5A to 5B, and thus a repetitive description will be omitted here.

Figure 10:
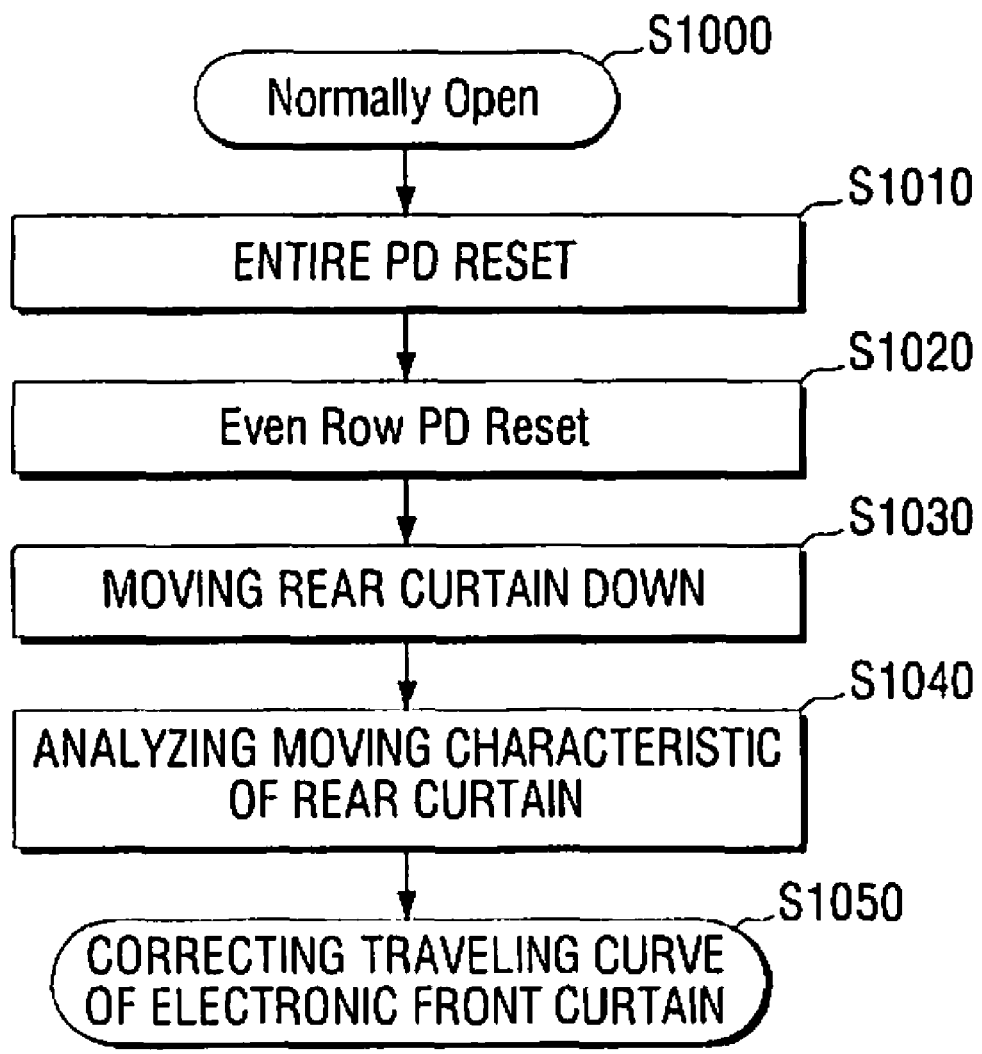
FIG. 10 is a flowchart illustrating a method of calculating a moving characteristic of a mechanical rear curtain in a focal plane shutter including only the mechanical rear curtain according to an embodiment of the present invention.

FIG. 10 is a flowchart illustrating a process of calculating a moving characteristic of a mechanical rear curtain in a focal plane shutter system that does not include a mechanical front curtain.

Referring to FIG. 10, in an imaging apparatus system using a focal plane shutter function, a shutter is opened in a live view mode in step S1000. An entire area of a photodiode of the image sensor is reset in step S1010. After a predetermined time elapses, a photodiode corresponding to an even row of the image sensor is reset in step S1020, and the mechanical rear curtain is moved in step S1030.

A difference between amounts of electric charges accumulated in the odd row and the even row of the image sensor is detected and a moving characteristic of the mechanical rear curtain is analyzed by calculating a ratio of different amounts of electric charge in step S1040. Finally, in step S1050, a moving curve of the electronic curtain is corrected according to the moving characteristic of the mechanical rear curtain.

By controlling the image sensor to follow the corrected moving curve of the electronic front curtain, the performance of the imaging apparatus having the electronic front curtain function can be improved and also the volume of the shutter module and the manufacturing cost can be reduced by removing the mechanical shutter.

In the above-described embodiments, the even row of the image sensor is reset after the entire area of the image sensor has been reset. However, this is merely an example for the convenience of explanation, and after some area of the image sensor has been reset, the remaining area may be reset.

Figure 11:
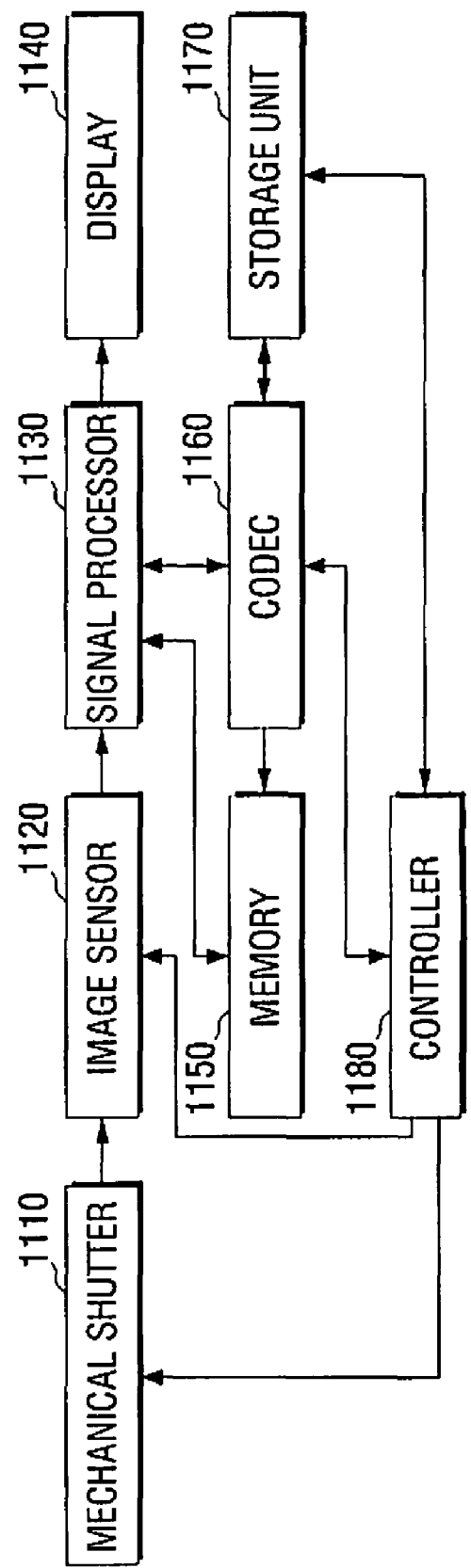
FIG. 11 illustrates an imaging apparatus according to an embodiment of the present invention.

FIG. 11 is a block diagram illustrating an imaging apparatus according to an embodiment of the present invention. For example, the imaging apparatus of FIG. 11 may be a digital camera or a digital camcorder. Any apparatus may be applied that can perform an imaging operation.

Referring to FIG. 11, the imaging apparatus includes a mechanical shutter 1110, an image sensor 1120, a signal processor 1130, a display 1140, a memory 1150, a CODEC 1160, a storage unit 1170, and a controller 1180.

The mechanical shutter 1110 may include a mechanical front curtain and a mechanical rear curtain or may include only a mechanical rear curtain. The front and the rear curtains may move vertically or horizontally. Also, the front and the rear curtain are located ahead of the image sensor 1120 of the imaging apparatus including the focal plane shutter and moves in a slit pattern to open and close an optical path to the image sensor 1120.

The image sensor 1120 generates image data of a subject using an amount of exposure light adjusted by the mechanical shutter 1110. The image sensor 1120 replaces the mechanical front curtain and performs the function of an electronic front curtain, which is advantageous in view of a shutter speed.

The signal processor 1130 performs signal-processing with respect to a video signal generated by the image sensor 1120. The memory 1150 stores information regarding an environment where an imaging operation is performed. The signal processor 1130 performs the signal-processing according to the information regarding the environment stored in the memory 1150.

The CODEC 1160 compresses the video signal signal-processed by the signal processor 1130 to generate video contents. The storage unit 1170 stores the video contents generated by the CODEC 1160 on a recording medium.

The storage unit 1170 reads out the video contents from the recording medium and transmits the video contents to the CODEC 1160. The CODEC 1160 decompresses the video contents and generates the video signal.

The display 1140 displays an image indicated by the video signal that is generated by the image sensor 1120 and signal-processed by the signal processor 1130. The display 1140 displays an image indicated by the video contents, which are read out by the storage unit 1170 and decompressed by the CODEC 1160.

The controller 1180 controls the mechanical shutter 1110, the image sensor 1120, the signal processor 1130, the display 1140, the memory 1150, the CODEC 1160, and the storage unit 1170 directly/indirectly to execute a user command.

For example, the controller 1180 controls the mechanical shutter 1110 and the image sensor 1120 to calculate a moving characteristic of the rear curtain of the mechanical shutter 1110. The controlling process has been already described in the above, and thus a repetitive description is omitted here.

In accordance with an embodiment of the present invention, the moving characteristic of the mechanical shutter 1110 is calculated, and the electronic shutter operation of the image sensor 1120 is controlled according to the calculated moving characteristic of the mechanical shutter 1110. Accordingly, the performance of the imaging apparatus that uses the focal plane shutter method and the electronic shutter function of the image sensor 1120 can be improved.

Also, even in the imaging apparatus without using a mechanical front curtain, the moving characteristic of the mechanical rear curtain can be calculated and also the electronic shutter operation of the image sensor 1110 can be corrected according to the moving characteristic of the rear curtain, so that the volume of the shutter module and the manufacturing cost can be reduced.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An imaging apparatus, comprising:
   an image sensor that performs an electronic shutter function;
   a mechanical shutter including a first curtain and a second curtain, which controls light incident on the image sensor; and
   a controller that calculates a moving characteristic of the mechanical shutter based on an amount of electric charge accumulated in a first area of the image sensor and an amount of electric charge accumulated in a second area of the image sensor, while the mechanical shutter is moving, and controls the electronic shutter function of the image sensor based on the calculated moving characteristic of the mechanical shutter,
   wherein the controller detects the amounts of electric charges accumulated in the first area and the second area at least two times at different locations while the mechanical shutter is moving, and calculates the moving characteristic of the mechanical shutter by inversely calculating a ratio of the amount of electric charge accumulated in the second area to the amount of electric charge accumulated in the first area for each location.

2. The imaging apparatus of claim 1, wherein the controller controls the first area and the second area differently, such that different amounts of electric charge are accumulated in the first area and the second area.

3. The imaging apparatus of claim 2, wherein the controller resets the first area of the image sensor, after the first curtain has moved, such that the different amounts of electric charge are accumulated in the first area and the second area.

4. The imaging apparatus of claim 1, wherein the first area includes an even row of the image sensor and the second area includes an odd row of the image sensor.

5. The imaging apparatus of claim 1, wherein the first curtain is a front curtain and the second curtain is a rear curtain, and the calculated moving characteristic is a moving characteristic of the rear curtain.

6. The imaging apparatus of claim 1, wherein the controller controls the electronic shutter function of the image sensor according to the calculated moving characteristic of the mechanical shutter.

7. An imaging apparatus comprising:
   an image sensor that performs an electronic shutter function;
   a mechanical shutter including a single curtain, which controls light incident on the image sensor; and
   a controller that calculates a moving characteristic of the mechanical shutter based on an amount of electric charge accumulated in a first area of the image sensor and an amount of electric charge accumulated in a second area of the image sensor, while the mechanical shutter is moving, and controls the electronic shutter function of the image sensor based on the calculated moving characteristic of the mechanical shutter,
   wherein the controller detects the amounts of electric charges accumulated in the first area and the second area at least two times at different locations while the mechanical shutter is moving, and calculates the moving characteristic of the mechanical shutter by inversely calculating a ratio of the amount of electric charge accumulated in the second area to the amount of electric charge accumulated in the first area for each location.

8. The imaging apparatus of claim 7, wherein the controller controls the first area and the second area differently, such that different amounts of electric charge are accumulated in the first area and the second area.

9. The imaging apparatus of claim 8, wherein the controller resets the second area before the mechanical shutter moves, after the first area of the image sensor has been reset, such that the different amounts of electric charge are accumulated in the first area and the second area.

10. The imaging apparatus of claim 7, wherein the first area includes an entire area of the image sensor and the second area includes at least one of an odd row and an even row of the image sensor.

11. The imaging apparatus of claim 7, wherein the controller controls the electronic shutter function of the image sensor according to the calculated moving characteristic of the mechanical shutter.

12. A method of controlling an imaging apparatus including an image sensor that performs an electronic shutter function, the method comprising:
- detecting an amount of electric charge accumulated in a first area of the image sensor and an amount of electric charge accumulated in a second area of the image sensor at least two times at different locations while the mechanical shutter is moving;
- calculating a moving characteristic of the mechanical shutter by inversely calculating a ratio of the amount of electric charge accumulated in the second area to the amount of electric charge accumulated in the first area for each location; and
- controlling the electronic shutter function of the image sensor based on the calculated moving characteristic of the mechanical shutter.

13. The method of claim 12, further comprising accumulating different amounts of electric charge in the first area and the second area.

14. The method of claim 13, wherein the mechanical shutter includes a first curtain and a second curtain, and
- wherein accumulating the different amounts of electric charge in the first area and the second area comprises resetting the first area of the image sensor, after the first curtain has moved.

15. The method of claim 12, wherein the mechanical shutter includes a single curtain, and
- wherein the different amounts of electric charge are accumulated in the first area and the second area by resetting the second area, before the mechanical shutter moves, after the first area has been reset.

* * * * *